United States Patent [19]
Robb

[11] Patent Number: 5,548,819
[45] Date of Patent: Aug. 20, 1996

[54] METHOD AND APPARATUS FOR COMMUNICATION OF INFORMATION

[75] Inventor: David C. Robb, Menlo Park, Calif.

[73] Assignee: SpectraPlex, Inc., Menlo Park, Calif.

[21] Appl. No.: 512,265

[22] Filed: Aug. 7, 1995

Related U.S. Application Data

[63] Continuation of Ser. No. 801,527, Dec. 2, 1991, abandoned.

[51] Int. Cl.$^6$ .................................................. H04B 7/02
[52] U.S. Cl. .......................... 455/59; 455/103; 455/137; 455/273; 375/349
[58] Field of Search .......................... 455/59, 103, 137, 455/273, 303, 337, 138, 52.1, 52.3, 63, 34.1, 34.2, 61; 371/68.2, 69.1; 375/343, 347, 349, 290

[56] References Cited

U.S. PATENT DOCUMENTS

| | | | |
|---|---|---|---|
| 723,188 | 3/1903 | Tesla . | |
| 725,605 | 4/1903 | Tesla . | |
| 3,296,532 | 2/1967 | Robinson | 325/305 |
| 3,305,781 | 7/1967 | Robinson | 325/305 |
| 3,350,646 | 10/1967 | Graziano | 325/305 |
| 3,699,450 | 1/1972 | Rainal | 325/363 |
| 4,494,238 | 2/1985 | Groth | 375/1 |
| 4,628,517 | 3/1986 | Schwarz et al. | 375/40 |

OTHER PUBLICATIONS

Cooper and McGillen, "Modern Communications and Spread Spectrum" McGraw–Hill 1986 pp. 268–411.
Inglis, ed. "Electronic Communications Handbook" McGraw–Hill 1988 pp. 22.1–22.19.
Rohde and Bucher, "Communications Receivers" McGraw–Hill, 1988 pp. 462–471.
Schilling, Pickholtz and Milstein, "Spread Spectrum goes Commercial", IEEE Spectrum, Aug. 1990 pp. 40–45.
Brennan, "Linear Diversity Combining Techniques", Proc. of the IRE, Jun. 1959 pp. 1075–1102.
Tiuri, "Radio Astronomy Receivers" IEEE Trans. Antennas and Propagation AP–12 (7) Dec. 1964 pp. 930–938.

Primary Examiner—Reinhard J. Eisenzopf
Assistant Examiner—Nguyen Vo

[57] ABSTRACT

A method for communication of information is described. The method provides for a much greater number of communication channels than available with conventional technologies. The number of communication channels that can be obtained is of the order of $n^2$, where n is the number of physical channels available. Further, the method provides robustness in the presence of noise, interference, path delays, and other adverse environmental conditions. It is also compatible with a number of privacy insuring methods, and has an inherent resistance to casual prying.

13 Claims, 6 Drawing Sheets

METHOD AND APPARATUS FOR COMMUNICATION OF INFORMATION

This is a continuation of application Ser. No. 07/801,527, filed 1991 Dec. 2, now abandoned.

SUMMARY OF THE INVENTION

The basic invention lies in utilization of the correlation between multiple signals, each signal containing a copy of the intended message, to expand the number of communication channels available given a limited number of physical channels, to reduce or eliminate the effects of various forms of interference, including multipath, and to obtain a measure of interception resistance, among other benefits. These advantages are obtained by transmitting multiple copies of the original signal via appropriate media, receiving the copies, extracting the correlated parts of the signals, and preparing an estimate of the original message signal.

BACKGROUND—FIELD OF INVENTION

The present invention relates to a method of and apparatus for electronic communication of information. The method greatly expands the information capacity of a limited number of channels, as well as reduces or eliminates the effects of multipath and other common forms of interference.

BACKGROUND—DESCRIPTION OF PRIOR ART

With the growing utilization of available channels for communication, there has been considerable interest in making maximum use of the limited resources available, especially in electromagnetic wave communication as well as telephony. In present radio communication methods, particular frequencies known as channels, are allocated for particular uses. Each channel is of some finite bandwidth to accommodate modulation spread and inaccuracies in frequency setting. As a consequence, with present methods, the number of channels a particular portion of the electromagnetic spectrum can provide is simply the frequency span available divided by the bandwidth associated with each channel. Under this scheme, the number of communication channels available is severely limited. This is particularly significant because allocation of the limited number of available radio channels is a present problem that is becoming more difficult each day as the number of potential users grows.

Further, most current methods do not allow simultaneous use of a particular frequency by different users, so that the efficiency of the channel is determined by the percent of time the channel is actually used for communication, and is not sitting idle. Various methods such as those described below have been applied in attempts to increase the utilization, or spectrum efficiency, of particular frequency ranges.

BACKGROUND—CAPACITY EXPANSION

Capacity expansion and spectrum efficiency increases have been effected by Frequency Division Multiple Access, Time Division Multiple Access, Code Division Multiple Access, bandwidth reduction, spatial division as in cellular telephony, and a variety of others. Each method has had a measure of success, as well as some significant limitations and problems.

Frequency Division Multiple Access is the method in most common use, and the one most familiar to users. AM broadcast radio, FM broadcast radio, television, and other services rely on this method to distinguish between and select stations. In this method, each user or service is assigned a particular frequency of operation and an associated range of frequencies about that center frequency. The range of frequencies accommodates tuning error and modulation spread of the main, or carrier, frequency. Two or more services cannot share the same frequency within a common geographic area because of mutual interference. Also, since each service is limited to a single frequency band, multipath and other forms of natural interference can significantly affect the signals and reduce the communication effectiveness. "Ghosting" in television is a familiar example of multipath interference.

Time Division Multiple Access is commonly used in telephony, and offers the advantage of expanding the communication capacity of a limited number of channels, be they wires, optical fibers, radio frequency bands, or others. This method operates by sampling a number of signals at a high rate, combining in sequence each of the samples, and then reconstructing the original signals from the respective samples at the receiving end. The number of signals that can be accommodated is determined by the ratio of the total period between successive samples of a given signal, to the duration of the individual samples. The disadvantages are numerous, and include a severe limitation on the bandwidth of the information signals being carried. This limitation arises from the fact that the information signals must be sampled as part of the process of time division multiplexing. Consequently, the signal bandwidths must be less than the Nyquist frequency, one-half of the sampling frequency, in order to avoid creation of aliased signal components in the reconstructed signal. Further, the complexity of such systems is high, and close synchronization between transmitter and receiver must be maintained in order to properly reconstruct the numerous sampled information signals. The method is very useful in telephony where many of the variables can be closely controlled, but is prohibitively difficult to implement in many other applications.

Code Division Multiple Access is a recent technique whereby the information carrying signal is modulated by a unique digital code sequence. At the receiver, the received signal is correlated with the same unique code sequence to obtain the original information signal. In theory, many users could share the same frequency allocation, so long as their digital code sequences were sufficiently different. In practice, the number of users is often reduced below the theoretical number by problems such as near-far interference, among others. In near-far interference, the nearer, stronger signal obscures the farther, weaker signal in the receiver, so that the far signal falls below the detectability limits of the receiver when the gain is sufficiently low to prevent saturation by the stronger near signal. The method is also complex, and considerable effort is required to design and develop systems that can acquire a signal in a reasonable time, and can maintain the synchronization necessary for proper decoding. Further, bandwidth limitations on the information portion of the signal may be restrictive given certain constraints on the bandwidth and operating frequency of the total system.

George Cooper and Clare McGillem discuss Code Division Multiple Access and other versions of what are termed "spread spectrum" systems in: "Modern Communications and Spread Spectrum", McGraw-Hill, 1986, pages 268–411. The authors discuss the disadvantages of spread spectrum approaches. Among these disadvantages are that the more useful forms require a wide bandwidth high quality channel, that a long acquisition time may be required, and the systems are complex in implementation, in addition to the near-far problem already discussed. Ulrich Rohde and T. T. N. Bucher present similar discussions and analyses in "Communications Receivers", McGraw-Hill, 1988, pages 462–471.

Another approach to the problem of expanding capacity is spatial division, an exemplary model of which is cellular telephony. For some time, radio frequency allocations have been geographically distributed so services using the same frequency are sufficiently separated in space that they do not interfere with each other. Cellular telephony employs that principle on a much more local scale. "Electronic Communications Handbook" McGraw-Hill, 1988, pages 22.1–22.19, Andrew Inglis, editor, presents a discussion of the principles of cellular telephone systems. By careful control of transmitter power, clever assignment of frequencies, and a marvelously complex switching and control system, several thousand users can be accommodated by only a few hundred frequencies. However, such systems will saturate so that no new users can be accommodated, the technology is expensive, conversations are not private, interference problems are significant, and service areas are limited, to cite only a few of the major problems of spatial division carried to extreme.

One current approach involves combination of spread spectrum methods with cellular structure. The article "Spread Spectrum Goes Commercial" by Donald Schilling, Raymond Pickholtz, and Laurence Milstein in IEEE Spectrum of August 1990, pages 40–45, discusses such combination. According to the article, each cell in a current cellular system serves about 55 users at a time. With spread spectrum methods, 150 to 300 users could be accommodated initially, with up to 1000 users later. This is about a twenty fold improvement in capacity, but at a substantial cost, and will probably still fall short of demand in certain high density areas.

BACKGROUND—RECEIVER SELECTION

A further problem of many communication methods is that, especially in the case of radio communication, selection of a desired receiver is difficult. The problem is two fold, first in getting the attention of the correct receiver, and second in preventing interception by undesired receivers. Various schemes have been used to address these problems, often at considerable cost in complexity, power requirements, spectrum efficiency, or other areas. Receiver selection has been accomplished by channel assignment, either cooperative or uncooperative, directional alignment (pointing), message coding, and others.

In the simplest form of channel assignment, each user is allocated a separate frequency. In order to select a particular receiver, the transmitter is tuned to the assigned frequency. Many mobile telephone systems function this way, as well as aircraft radio systems and others. A problem is that the signal is available to any receiver on that particular frequency. This is sometimes advantageous, but in most cases precludes a private exchange. More complicated forms of channel assignment use an exchange process between the transmitter and receiver to select a channel or set of channels which are not in use by other users at the time. While this method makes available a greater number of channels to a user, it suffers from most of the same disadvantages as its simpler versions.

Spread spectrum technologies have been applied to address receiver selection as well as problems of privacy, security, interference, and interception. Encryption methods have also been applied to further assure privacy. Both the Cooper and McGillem as well as the Rhode and Bucher references cited earlier discuss use of spread spectrum in receiver selection as well as privacy assurance. The inherent complexity of such systems as well as their other problems already discussed make them questionable candidates for long term solutions.

BACKGROUND—INTERFERENCE SUPPRESSION

In addition, electromagnetic wave communication is further complicated by interference. For example, electromagnetic waves can be reflected, and often will travel between source and destination by a variety of simultaneous paths. The difference in the individual path lengths results in a phase difference along each path at the destination. This phase difference will affect how the individual waves sum together. In some cases the waves will add so as to cancel to a greater or lesser degree the original wave, resulting in signal fading, or multipath interference. At other times, the phase shift is great enough that multiple copies of the original signal shifted in time are received, as in ghosting in television. Since these effects are frequency dependent, it has sometimes been necessary to allocate several different channels to a single use in order to insure at least one useable channel. This significantly reduces the spectrum efficiency. Such multiple allocation is called frequency diversity, and is one of the more powerful ways of dealing with multipath effects.

Numerous diversity systems have been devised and implemented. A general work describing such systems was written by D. G. Brennan. This paper, "Linear Diversity Combining Techniques", was published in the Proceedings of the IRE for June 1959, pages 1075–1102. Described in this work are three methods of implementing diversity systems: selection, maximum ratio, and equal gain. In selection, only one channel is selected to contribute to the output of the system. Various approaches to control the selection process include estimating signal to noise ratios in each channel and selecting the best channel, selecting the strongest channel, or other methods. In maximum ratio methods, all channels contribute to the output, but the amount each contributes depends on some measure of the system such as noise in the channel or signal to noise ratios. The particular contribution distribution is chosen to optimize the system performance. Equal gain methods simply combine all channels equally. Brennan states: "The object of these techniques is to make use of the several received signals to improve the realized signal to noise ratio . . . ". In no instance, though is the correlation of signals fully exploited by diversity systems to improve signal to noise, or for any other purpose. In fact, since most systems select or combine their signals prior to demodulation, they cannot take advantage of the correlation of the information signals present in the channel signals. Thus channel utilization is low and power requirements are high.

The significant problem in diversity systems is in the selection or combining of signals to obtain the desired output. An example of a solution to the problem is given in "Diversity Combiners", U.S. Pat. No. 3,296,532, issued Jan. 3, 1967 to Peter Robinson. This patent describes an optimal ratio combiner which adjusts the gain of each channel according to an estimate of the signal to noise ratio present on the respective channel, so as to minimize the noise and maximize the signal. The channel samples are summed, and correlation between the signals is not used for any purpose.

A second patent: "Diversity Combiners", U.S. Pat. No. 3,305,781, issued Feb. 21, 1967 to the above inventor, Peter Robinson, describes a variation whereby the signal to noise ratio is used to control a selector switch so that the channel with the best signal to noise ratio is selected to be the sole contributor to the output signal. In such a case, no correlation between information signals is possible.

It is important to note that in selection implementations of frequency diversity, the power radiated in the unselected channels is lost, and does not contribute anything to the output signal. This reduces spectrum efficiency as well as power efficiency.

Another patent, "Closed Loop Ratio Square Diversity Combiner", U.S. Pat. No. 3,350,646, issued Oct. 31, 1967 to Victor Graziano describes a different method for determining the optimal ratio of combination for the signals. In his method, however, the signals are combined prior to detection. In such a system, it is not possible to use correlation between the individual channels to obtain improvement in the information signal, since estimates of the information signal are not available at the time the channel signals are combined.

A final patent, "Digital Radio System", U.S. Pat. No. 4,628,517, issued Dec. 9, 1986 to Theodor Schwierz and Bernd Sommer describes a frequency diversity communication system where the channel frequencies are separated by a constant amount, and are coherently modulated. The receiver system, however, converts each channel frequency to a common intermediate frequency, and controls the frequency and phase of each channel signal to produce an optimal sum of the individual channel signals. The summed intermediate frequency signal is demodulated to obtain the information signal. Such a system has, many of the necessary elements to exploit the correlation between the channel signals, but takes a different path and thereby misses the opportunity to realize most of the benefits of correlation between channels.

A second approach, called spatial diversity, uses multiple receiver antennas spatially separate, since the interference effects are also position dependent. While this method does not adversely affect channel allocations, it does have certain practical difficulties which make it of limited usefulness. Most notable is the necessity for multiple antennas to be located at spatially separate points. Such an arrangement is particularly difficult in mobile applications such as aircraft radio where location of a single antenna is often problematical, let alone several antennas.

BACKGROUND—CORRELATION METHODS

One way that the information from multiple copies of the same message can be used is by correlating the signals. Uncorrelated noise will be averaged to zero while the desired signal will be enhanced. Previous uses of correlation techniques have existed, especially in radio astronomy. Tiuri discusses such use in "Radio Astronomy Receivers" in IEEE Transactions on Antennas and Propagation, Vol. AP-12, no. 7, December 1964, pp 930–938. The primary use of correlation, however, has been to effect reduction of noise due to pre-IF amplifier and component noise, such as antenna and transmission line noise.

An example of such an application is given in the patent "Apparatus for Measuring Low Level Power", U.S. Pat. No. 3,699,450, issued Oct. 17, 1972 to Joseph Rainal. This patent exploits correlation to eliminate effects of receiver noise, and adds bandpass filters in the parallel paths to reduce the effects of gain fluctuations in the receivers. In this case, as with other applications of correlation receivers, the receivers are set to the same frequency, so there is no advantage to be gained in terms of reduced multipath interference, receiver selection, or other benefits.

An interesting invention described in U.S. Pat. No. 4,494,238, entitled "Multiple Channel Data Link System", issued Jan. 15, 1985 to Edward Groth, Jr. is another example where the opportunity to exploit correlation was neatly sidestepped. The invention describes a spread spectrum communication system where multiple channels are coherently modulated, but then the individual channels are further modulated with a Pseudo Noise digital code unique to that channel. This code permits identification of each channel for later selection purposes. At the receiver, the channel signals are decoded and converted to a common intermediate frequency such that the individual channel signals are coherent, much like the Schwierz and Sommer patent cited earlier. Similar to the Schwierz and Sommer patent, the channel signals are summed and then demodulated. Further, since each channel signal is identifiable by its unique code, their invention describes a means for monitoring the quality of signal on each channel and discarding those which are not of acceptable quality. Again, the correlation between channels due to the common information signal each carries is ignored or overlooked, and the channel signals combined in a way that precludes use of such correlation.

A final example of an apparent type of correlation use is presented in two patents, "Method of Signaling", U.S. Pat. No. 723,188, issued Mar. 17, 1903, and "System of Signaling", U.S. Pat. No. 725,605, issued Apr. 14, 1903, both by Nikola Tesla. These patents describe a system where multiple copies of a message are transmitted, and the receiver will only respond when all copies are received. In close reading of the patents, it becomes clear that Tesla is making an early use of the boolean AND condition to insure accurate and private reception of the transmitted signals. In such a system, all copies of each transmission must be accurately received. Unlike the system of the present invention described below, loss of any one of the multiple copies will result in loss of the message.

In general, the methods for capacity expansion, interference suppression, receiver selection, and others, have been applied separately and are often incompatible among themselves, for example, Pseudo Noise spread spectrum is not readily compatible with frequency diversity. Combining various techniques to exploit correlation effects and obtain advantages in increased message transfer reliability, channel selection, expansion of the effective number of channels, and other benefits has not been realized before. Indeed, in several instances, inventors have missed the benefits of correlation by narrow margin, indicating the subtle nature of its power.

OBJECTS AND ADVANTAGES OF THE INVENTION

Accordingly, the objects of the present invention are several. First is to expand the information capacity of a limited number of channels without reducing the signal bandwidth, availability, or other desirable qualities. A second object is to reduce the effects of interference on information transfer, particularly multipath effects and noise. A third objective is to provide these objects in a system which may be simply implemented by appropriate application of known technology. A further object is to improve the privacy of information transfer by making casual interception of meaningful signals difficult.

The advantages of this invention are manifold. In general, the invention greatly expands the information capacity of a limited number of channels. It allows simultaneous non-interfering use of individual physical channels. It is simple in implementation. It provides a simple means of receiver selection. It has inherent resistance to casual interception of meaningful signals.

In radio communication, it provides fade resistance due to multipath interference. It does not require acquisition time. It operates asynchronously. It reduces or eliminates the near-far problem. It reduces or eliminates the effects of interference, including much intentional interference. It does not require contiguous bands. It preserves range information. It reduces noise and improves signal quality. It can share frequencies presently used by other systems with minimal effect on either system. It reduces the probability of unintended listeners intercepting the signal. It provides a means of receiver selection.

In telephony and data communication, it offers the advantages of simple repeater circuitry. It simplifies or eliminates the need for power control of the transmitter. It makes available a relatively large number of channels for a small frequency allocation. It promotes simple privacy assurance methods in addition to its inherent privacy qualities. It is compatible with existing networks

BRIEF DESCRIPTION OF THE DRAWINGS

In several of the drawings, the same reference numeral is sometimes used to indicate apparently different entities. In such cases, the numeral should be interpreted as indicating a class of entities of which the specific indicated items are instances.

ANNOTATED REFERENCE NUMERALS IN THE DRAWINGS

100 Information signal: This is the signal containing the information to be communicated.

110 Channel Carrier (used): This is one of the members of the subset of carriers used in this particular communication channel.

120 Channel Carrier (unused): This physical channel is not used in this particular communication channel, but may be used in others.

125 Selector switch: This switch is operated under control of the channel selector 130 to select its associated physical channel as one of the members of a particular communication channel, or to set its associated channel to an unused condition. Conceptually, the collective set of switches 125 represent an N output of M inputs selector matrix. As such, the simple element shown is representational only, and an actual matrix would be more complex.

130 Channel selector: This provides the control for the selector switches 125 to select the proper set of N physical channels which will comprise the particular communication channel.

140 Modulator: This element impresses the information signal on the carrier channel.

150 Combiner/Transmitter unit(s): This unit combines the modulated carrier signals which share common media of transmission, and provide other modification such as power amplification, impedance matching, electrical to light wave conversion, and so forth, as may be necessary.

160 Transmission medium: This is the medium by which the channel carrier signals are conveyed.

165 Additional transmission media: These media are used when there is more than one type of channel carrier used in a particular implementation, such as radio in combination with cable and light beam.

170 Channel receiver (part of set): These receivers receive the modulated carrier signals which form the set for this particular communication channel.

175 Channel selection controller: This element controls the channel selector matrix 185 to select the particular set of signals from channel receivers 170 and 180 which will become the selected channel signals 195. This element corresponds to the channel selector 130 in the transmitter, and performs the complementary function in the receiver.

180 Channel receiver (unused Channel): These receivers are not used in the set of channels which form this particular communication channel, but may be used in sets for other communication channels.

185 Channel selector matrix: This element selects the set of N signals from the M channel receivers which make up this particular communication channel.

190 Information signal estimate: This is the received information signal which reproduces the information signal transmitted. It is an estimate in that there may be noise or other artifacts present due to unavoidable conditions or events which introduce spurious signals which would not be removed by the correlation process.

195 Selected channel signals: These are the outputs from the channel receivers which comprise the set of channels that form a communication channel.

200 Correlation/summation unit: This is the heart of the system and is responsible for separating the information signal which is correlated between the input signals from noise and interference which is uncorrelated between the input signals.

210 pcov function block: This element is responsible for producing a signal which is the correlated portions of its two inputs.

220 Summator/scaler: This component adds together the outputs of each of the correlation elements, and optionally provides scaling to obtain a value proportional to the average of its inputs.

230 Output signal from the pcov function: Each of these signals are summed by the summator/scaler element 220 to obtain the information signal estimate 190.

300 Input signal multiplier: This element produces an output signal which is equivalent to the product of its two input signals.

305 Product signal: This signal represents the product of the two input signals 195.

310 Absolute value circuit: This produces an output signal which is equivalent to the absolute value of its input signal. In some applications it could be expressed as a simple rectifier or equivalent without adverse effect on the operation of the invention.

315 Absolute value of product signal: This signal represents the absolute value of the product signal 305. In some applications, an acceptable approximation may be obtained by simple rectification of the product signal.

320 Square root circuit: This produces an output signal which is equivalent to the square root of its input signal.

325 Squared feedback: This is a means of obtaining an estimate of the square root of a signal by placing a squaring element in the feedback loop.

330 Square root signal: This signal represents the square root of the absolute value of the product of the two input signals 195.

335 Sign of input signal: By comparing the input signal with zero, this signal which represents the sign of the input signal is obtained. Summing the unit sign signals of both inputs gives a coherent sign signal that assumes a non-zero level only when both inputs are of the same sign. Its level alternates between a positive constant value, zero, and a negative constant value, and is interpreted as a unit sign function.

340 Sign transfer circuit: This circuit transfers the sign of one signal to an absolute valued signal 330 by first obtaining a unit sign signal 335 and then multiplying the absolute value signal by that unit sign.

Figure 4:
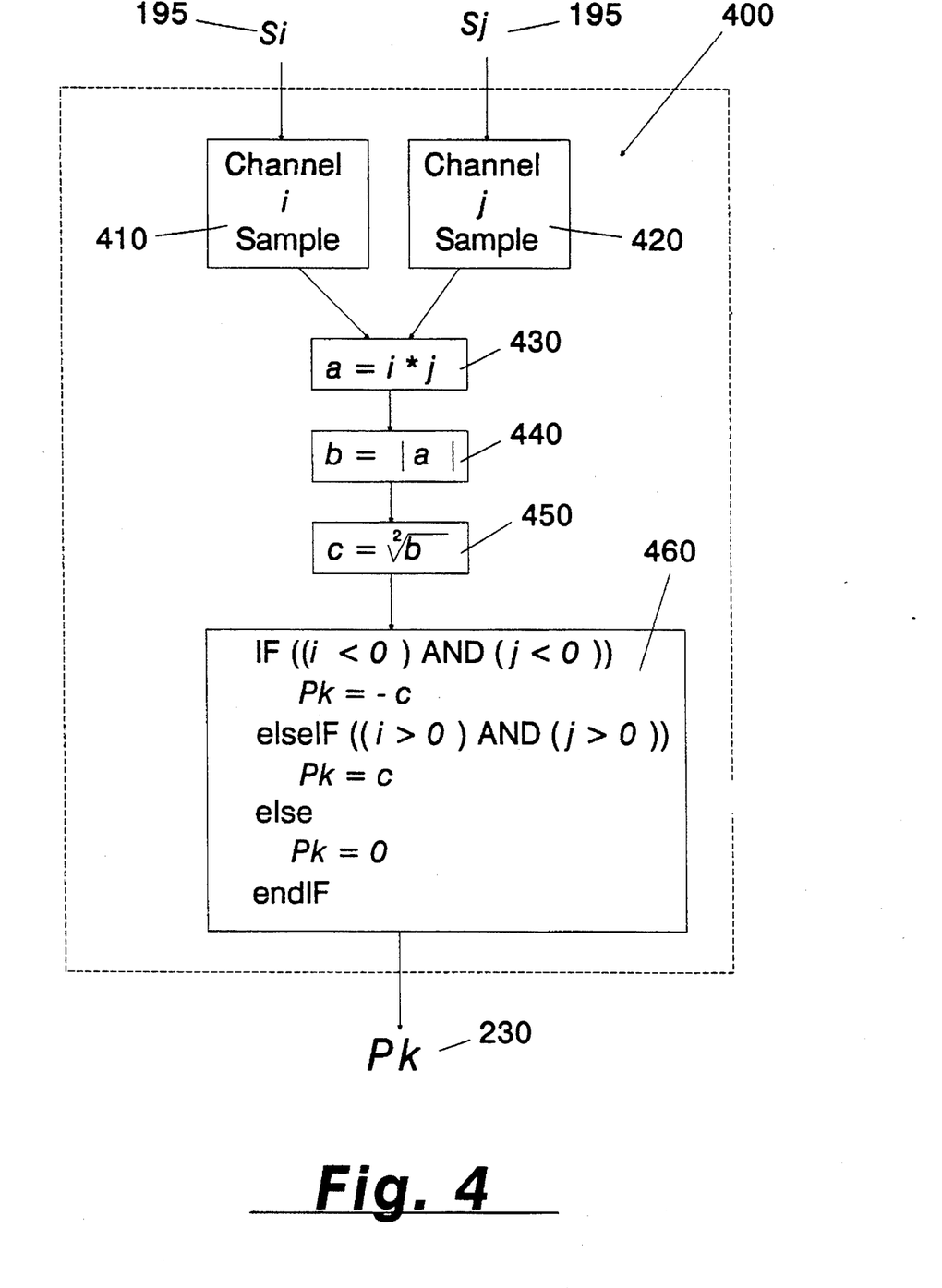
FIG. 4 is a flow chart for a software implementation of the pcov function.

400 Software version of the pcov function: This is a flow diagram of the software operations necessary to calculate the correlation of the two input signals.

410 Channel sample i: This is a sample of the instantaneous value of one of the two input signals 195. Assuming the calculations are to be performed by a digital computer, such computer cannot deal with continuous signals. Hence, samples must be taken which represent the value of a signal at an instant in time. The sample is represented by the variable name i, and it is assumed that the sampling process will be repeated at a sufficient rate to form an accurate representation of the original signal.

420 Channel sample j: This is a sample of the instantaneous value of the second of two input signals 195. This sample is represented by the variable name j, and is subject to the same assumptions as sample 410 above.

430 Product of channel samples: The variable a represents the product of the two input signal samples 410 and 420.

440 Absolute value of product: The variable b represents the absolute value of the channel sample product 430.

450 Square root: The variable c represents the square root of the absolute value 440. 460 Sign transfer step: The variable Pk represents the root 450 with a sign determined by the value of the channel sample 410.

DESCRIPTION OF THE PREFERRED EMBODIMENT

The basic invention uses correlation between multiple signals, each containing a copy of the message of interest, to obtain the benefits of noise reduction, expansion in the effective number of communication channels, receiver selection, interference suppression, privacy, and others, and as such, may be expressed in many different embodiments. The following description, for convenience, shows a particular embodiment, but it will be readily apparent to those skilled in the necessary arts that other embodiments perhaps better suited to particular applications may be designed while still operating within the scope of the invention. Any embodiment of the invention must include the steps of modulating a set of carriers with a common information signal, transmitting the set of carriers, receiving the carriers, extracting the correlated information from the received signals, and preparing an estimate of the original information signal.

Figure 1A:
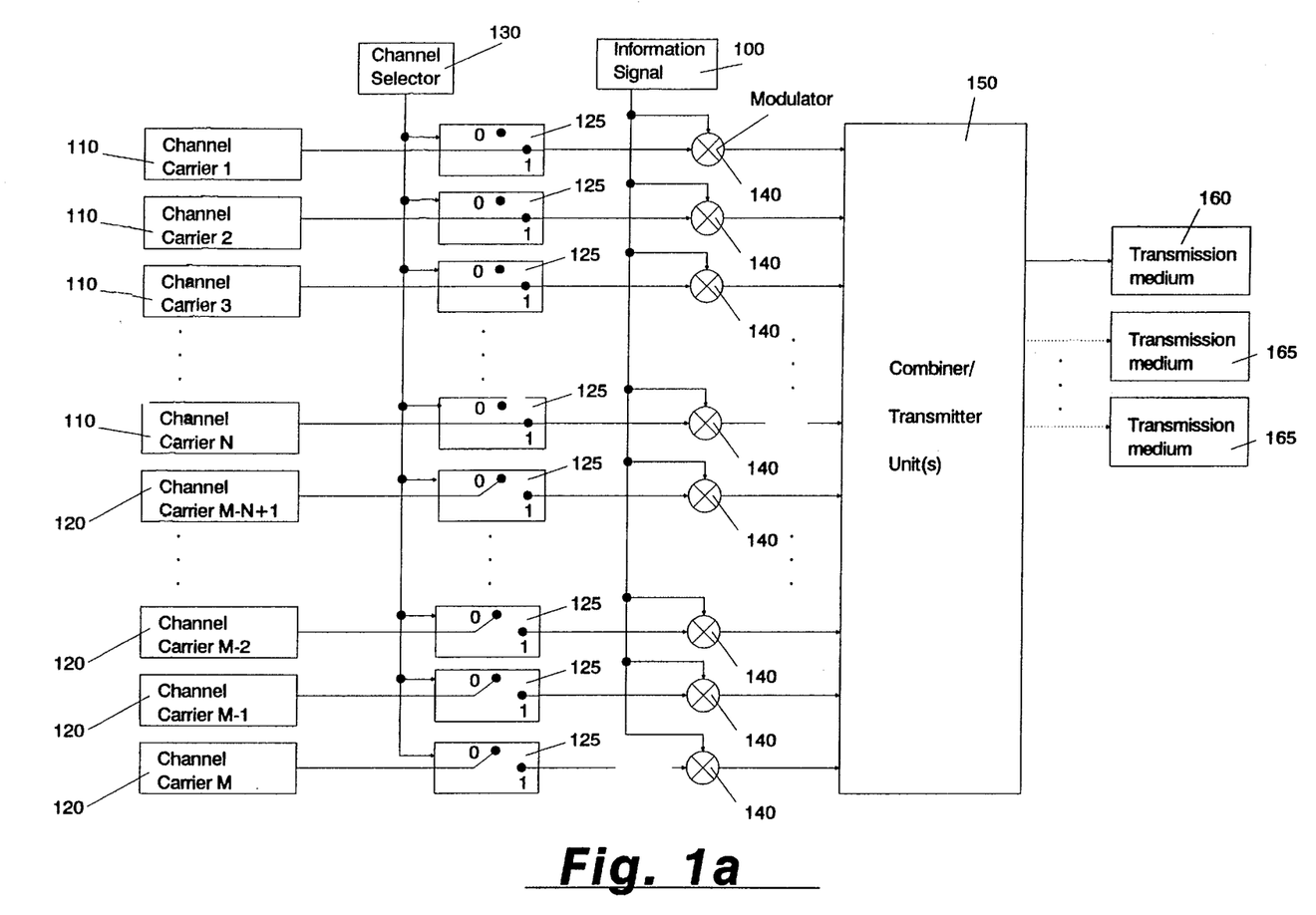
FIG. 1a shows a representative schematic of a transmitter unit which embodies the method of this invention.
Figure 1B:
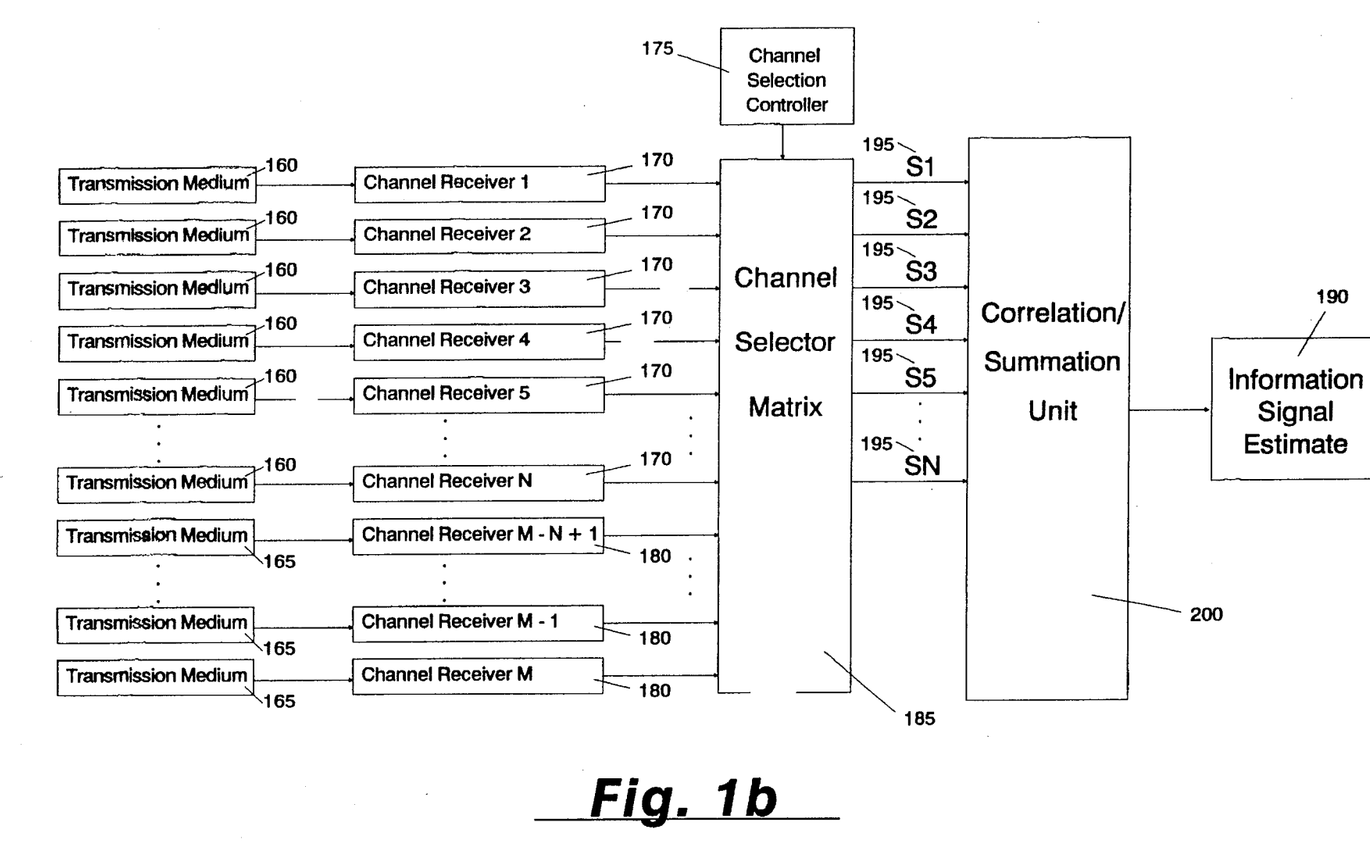
FIG. 1b shows a representative schematic of a receiver unit which embodies the method of this invention.

FIG. 1a illustrates in block schematic a transmitter system while FIG. 1b shows a corresponding receiver system. In the transmitter system there are multiple channel carriers 110 and 120. Each channel carrier, called a physical channel, can be one of a number of different carriers, For example, a carrier could be a particular radio frequency, a laser beam, a light beam in an optical fiber, a current in a wire, or a sound wave, among other carriers. A particular embodiment may, in fact, include a mix of several different carriers to obtain the advantages of the invention in a particular communication application.

The total set of physical channels available to a particular embodiment has M members, A subset of these M channels is chosen to form a particular logical communication channel. This subset is of size N, where N is less than M. From the set of M channels, many subsets of size N may be drawn. In the preferred embodiment the subsets will be drawn such that no more than half of the N members of any subset are shared with any other single subset, although any member channel may be used in several subsets. Under such constraints, the maximum number of subsets of size N, each subset forming a communication channel, that may be drawn from a set of M channels may be approximated by the function K(M,N) below:

$$K(M,N) = \frac{(M-N)(M-N+1)}{2} \text{ for } N \text{ even;}$$

$$K(M,N) = \frac{(M-N-1)(M-N)}{2} \text{ for } N \text{ odd;}$$

Table 1 below gives exact numbers of communication channels available for various combinations of M and N.

TABLE 1

Numbers of Communication Channels

| | | | | | M | | | | | | | | |
|---|---|---|---|---|---|---|---|---|---|---|---|---|---|
| N | 5 | 6 | 7 | 8 | 9 | 10 | 11 | 12 | 13 | 14 | 15 | 16 | 17 | 18 |
| 2 | 10 | 15 | 21 | 28 | 36 | 45 | 55 | 66 | 78 | 91 | 105 | 120 | 136 | 153 |
| 3 | 2 | 4 | 7 | 7 | 8 | 10 | 13 | 17 | 22 | 28 | 35 | 35 | 36 | 38 |
| 4 | 1 | 3 | 7 | 14 | 14 | 18 | 26 | 39 | 55 | 77 | 105 | 140 | 140 | 148 |
| 5 | 1 | 1 | 1 | 2 | 3 | 6 | 11 | 11 | 14 | 20 | 26 | 34 | 44 | 52 |
| 6 | | 1 | 1 | 1 | 3 | 3 | 6 | 10 | 18 | 26 | 36 | 48 | 65 | 88 |

Larger values of N provide more noise immunity, and greater resistance to interception. However, if N is too large, the system complexity becomes high and the number of communication channels available for a given value of M is greatly reduced. Also, due to the constraint that no more than half of the physical channels be in common between any pair of communication channels, use of odd values of N will result in fewer communication channels than for nearly equal even values. For most embodiments, an optimal number for N will lie between four and eight.

Table 2 below gives the approximate maximum number of communication channels available for various combinations of M and N. Physical channels must be assigned to each of the subsets. Such an assignment is subject to the previously mentioned constraints. An example of such an assignment for M equal to eight and N equal to four is shown in table 3. In the table, a 1 indicates that physical channel is selected to be part of the indicated communication channel. A value of 0 is used to show that channel is not selected. Note that while any individual channel may appear in several different communication channels, no more than half the physical channels of any one of a pair of communication channels are in common with the channels of the other member of the pair.

TABLE 2

Approximate maximum number of communication channels

| M | N | Communication Channels |
|---|---|---|
| 10 | 4 | 21 |
| 20 | 4 | 136 |
| 50 | 4 | 1081 |
| 100 | 4 | 4656 |
| 200 | 4 | 19306 |
| 500 | 4 | 123256 |
| 800 | 4 | 317206 |
| 1000 | 4 | 496506 |
| 500 | 8 | 121278 |
| 500 | 16 | 117370 |
| 500 | 32 | 109746 |

Returning to FIG. 1a, a channel selection mechanism 125, controlled by a channel selector 130, selects the N channels 110 which will form the particular communication channel. The remaining M–N channels 120 are unused for the particular communication channel illustrated, but could be used in forming other communication channels. The selected channel carriers are modulated by the modulation elements 140 with the desired information signal 100. The modulation could be AM, FM, PCM, PWM, FSK, on/off, or any other method appropriate to the particular channel carrier and information signal. The modulated channel carriers are passed to one or more combiner/transmitter units 150. If, for example, several of the channel carriers are radio frequencies, the signals might be combined for transmission through a common antenna. Other channels might employ different transmitter structures. For instance, a fiber optic signal would require a light source and a means of coupling the modulated light beam to the optical cable.

The purpose of the combiner/transmitter units 150 is to prepare the carrier signals for their appropriate media 160 and 165. In many applications, a single medium 160 will be used for transmission. In other applications, additional media 165 may be required, as for example, a combined use of broadcast RF and light beam carriers. Once prepared, the signals are introduced to their appropriate media, and the message is sent on its way.

FIG. 1b depicts the receiver portion of the communication system. The transmitted signals are obtained from their respective transmission media by the channel receivers 170 and 180. As in the transmitter, only a subset of the channel receiver outputs are used in a particular communication channel. An exception to this use of a subset of receiver outputs is in the case of the single communication channel system, where, for reasons of economy, all receiver outputs would likely be used. The channel selector matrix 185, under control of the channel selection controller 175, selects the proper subset of size N from the M physical channels for the particular communication channel to be used. In a single channel application, the selector matrix could be omitted. It is important that both transmitter and receiver systems use the same combination of physical channels in each particular communication channel. If fewer than half the channels correspond between the transmitter and the receiver units, the message content may be lost.

TABLE 3

| Communication | Channel assignments | | | | | | | |
|---|---|---|---|---|---|---|---|---|
| | Physical Channel | | | | | | | |
| Channel number | 1 | 2 | 3 | 4 | 5 | 6 | 7 | 8 |
| 1 | 1 | 1 | 1 | 1 | 0 | 0 | 0 | 0 |
| 2 | 1 | 1 | 0 | 0 | 1 | 1 | 0 | 0 |
| 3 | 0 | 0 | 1 | 1 | 1 | 1 | 0 | 0 |
| 4 | 1 | 0 | 1 | 0 | 1 | 0 | 1 | 0 |
| 5 | 0 | 1 | 0 | 1 | 1 | 0 | 1 | 0 |
| 6 | 0 | 1 | 1 | 0 | 0 | 1 | 1 | 0 |
| 7 | 1 | 0 | 0 | 1 | 0 | 1 | 1 | 0 |
| 8 | 0 | 1 | 1 | 0 | 1 | 0 | 0 | 1 |
| 9 | 1 | 0 | 0 | 1 | 1 | 0 | 0 | 1 |
| 10 | 1 | 0 | 1 | 0 | 0 | 1 | 0 | 1 |
| 11 | 0 | 1 | 0 | 1 | 0 | 1 | 0 | 1 |
| 12 | 1 | 1 | 0 | 0 | 0 | 0 | 1 | 1 |
| 13 | 0 | 0 | 1 | 1 | 0 | 0 | 1 | 1 |
| 14 | 0 | 0 | 0 | 0 | 1 | 1 | 1 | 1 |

Figure 2:
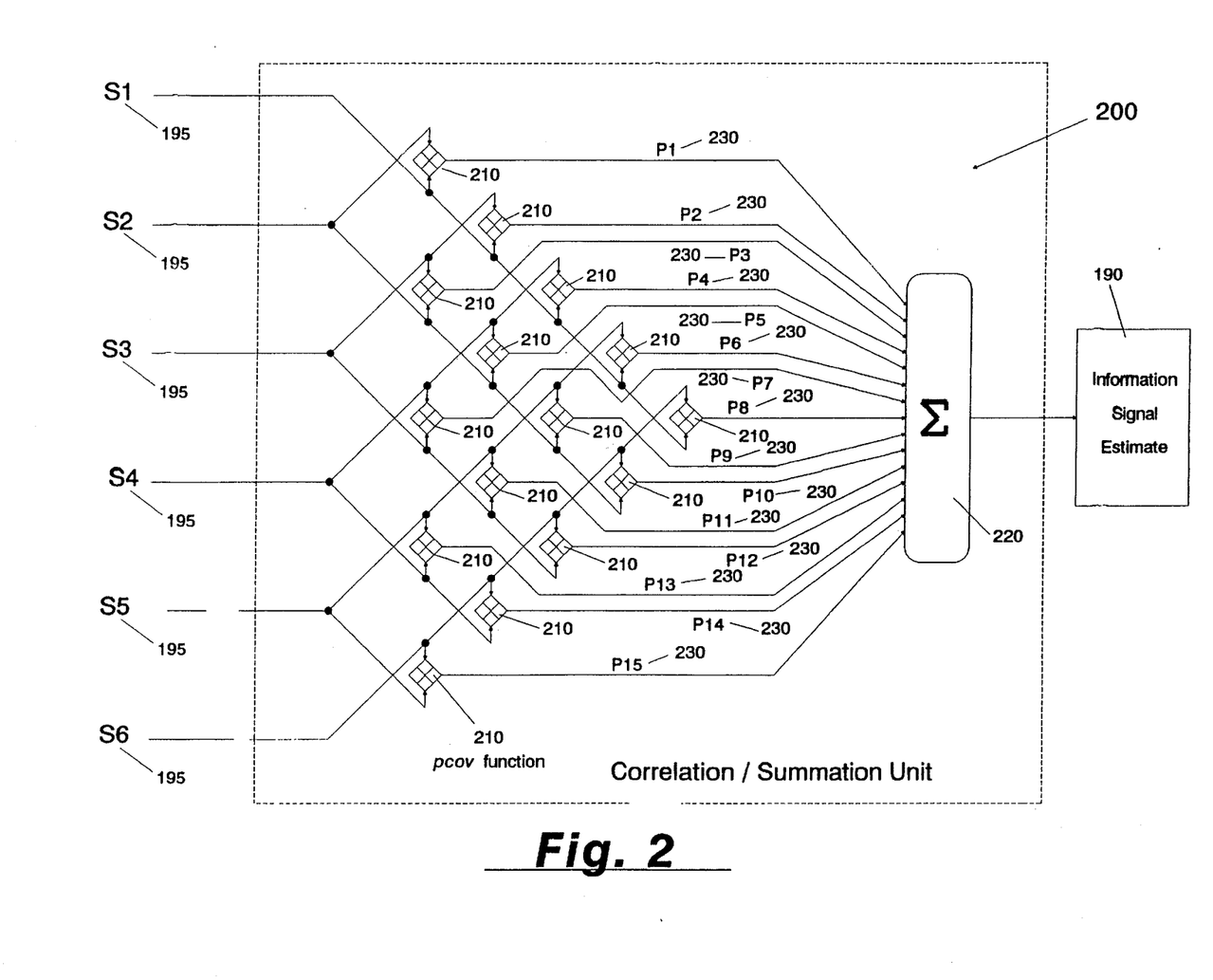
FIG. 2 provides greater detail of the correlation/summation unit depicted in the receiver system of FIG. 1b.

The N signals 195 of the particular communication channel are applied to the correlation/summation unit 200. In a specific application, this unit could be implemented as a hardware or software unit, as appropriate to the application. Within the unit is a structure such as is shown in FIG. 2.

Figure 3:
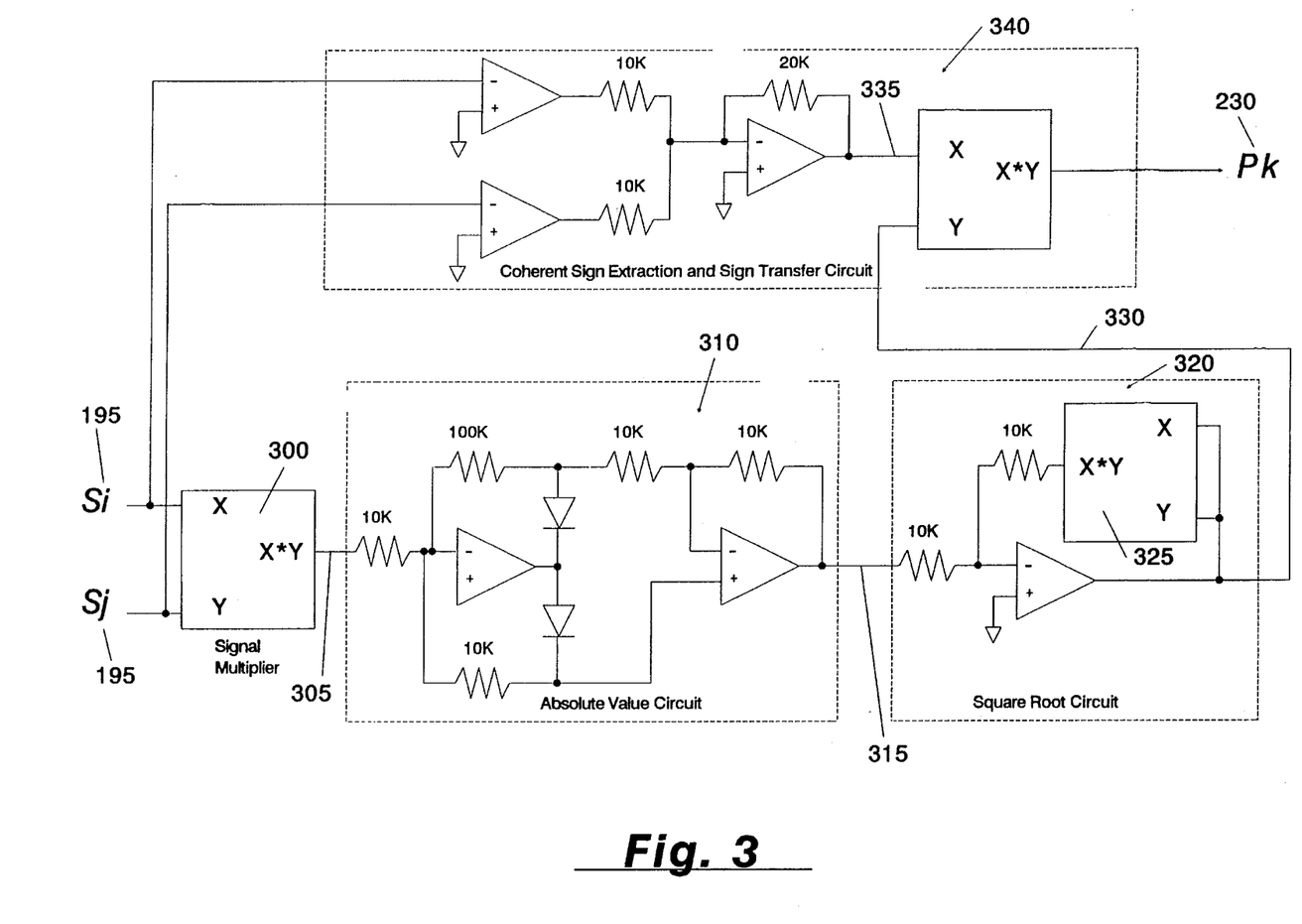
FIG. 3 is a schematic of an implementation of the pcov function in electronic hardware.

Within the correlation unit, the signals 195 are distributed to a number of function elements 210. These function elements perform a type of correlation function, called here a pcov function, on pairs of signals 195 to produce an output signal 230. The pcov function can be implemented in many different ways. FIG. 3 shows a hardware implementation, while FIG. 4 is a flowchart for a software implementation. This function will be described in further detail later. The optimal number of pcov function elements 210 is given by the relation G(N) below.

$$G(N) = \frac{N*(N-1)}{2} \text{ where } N = \text{the number of channels}$$

A particular implementation may use more or fewer pcov elements in order to obtain certain benefits such as reduced cost, but in general, the function G(N) computes the optimum number of pcov elements to use. Fewer elements 210 will not take maximum advantage of the correlated information in the multiple signal copies, while more elements will result in redundant output signals. The G(N) pcov elements are arranged as shown in FIG. 2 such that each signal 195 is paired once with every other signal 195. Table 4 gives the optimum number of correlation terms as calculated by G(N) above for several values of N.

TABLE 4

| N | optimum numbers of correlation terms Terms |
|---|---|
| 4 | 6 |
| 6 | 15 |
| 8 | 28 |
| 15 | 105 |
| 16 | 120 |
| 32 | 496 |
| 33 | 528 |

The outputs 230 from the pcov elements 210 are applied to a summation unit 220. The summation unit completes the correlation process by adding all of the pcov outputs together to form an estimate 190 of the original message signal. In the summation, the uncorrelated noise and interference signals, which have been randomized by the pcov function, will average to zero and thus disappear from the output signal. The correlated signals, conversely, will add coherently, and will thus reproduce the original information signal. Again, the summation process may be expressed in a hardware or software form as appropriate to the particular embodiment.

The pcov function element 210 is critical to this invention. It has a number of properties necessary to its proper function: correlated input signals are reinforced in the output; uncorrelated input signals are effectively randomized in the output; the sign of the correlated input signals is preserved in the output. In general, the pcov function is a member of the class of correlation filters. Such filters act to pass input signals which are correlated to each other, and to block signals which are uncorrelated. The pcov function is particularly well suited to this invention, but it is not the only filter of this class that could be successfully applied in an embodiment of this invention. For example, in one instance the correlation filter could be designed as an appropriately structured Surface Acoustic Wave device, or in another instance, as a switched capacitor device.

Two different implementations of the pcov function are illustrated. FIG. 3 shows a hardware implementation of the pcov function, while FIG. 4 shows a software flow chart for the function. Element 210 accepts as inputs, two signals Si and Sj which are bipolar in that they cross the zero axis in their excursions. Further, the long term average value of each is zero. The pcov function computes a signal shown as 335 in FIG. 3 and as 440 in FIG. 4, which represents the coherent sign of Si and Sj. In some implementations, it may be desirable for reasons of economy, simplicity, or others to replace the coherent sign function with the sign of either Si or Sj. So long as the quality of the sign signal is sufficiently high to accurately represent the true sign of the original information signal most of the time, such substitution should have little or no effect on the operation of the device, and should be considered as operating within the scope of the invention. A second signal 330 in FIG. 3 and 450 in FIG. 4 is computed which equals the square root of the absolute value of the product of Si and Sj. It will be recognized that equivalent results will be obtained if the absolute value of Si and Sj are obtained prior to formation of the product as if the product is computed first and then the absolute value taken. The two signals 330 and 335 or 440 and 450 are then combined so that the signal 330 or 440 assumes the sign of 335 or 440. The result becomes the output of the pcov function.

Figure 5:
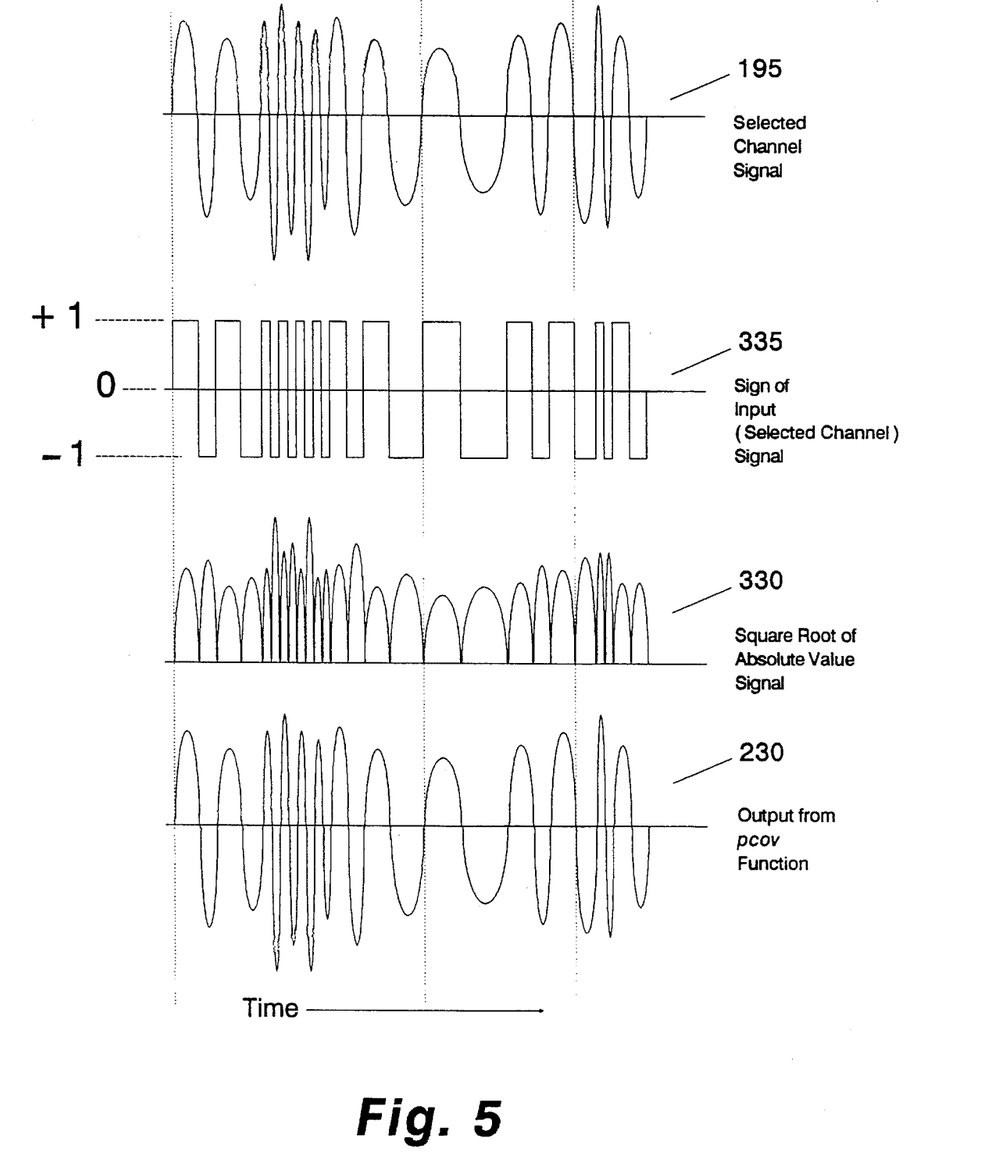
FIG. 5 is a diagram of signals at various points within the pcov function.

Typical signals at various points in this process are illustrated in FIG. 5. A signal representative of a typical demodulated carrier channel signal 195 is shown first. Immediately below the channel signal is a unit sign signal 335 corresponding to the channel signal sign. Note the time alignment of the signals as indicated by the vertical dotted lines. Below the unit sign signal is shown a signal 330 representative of the channel signal 195 after the absolute value and square root operations. Finally, the last signal 230 represents the signal 330 after application of the unit sign signal 335.

If the input signals were perfectly noiseless and without phase difference, the absolute value calculation in 510 and 440 would not be necessary, as the signal at that point would be simply the square of the information signal, and as such, would always be positive, With noisy signals, though, the product of the two signals may take on negative values. The square root of a negative number is a complex value, and is not readily accommodated in real hardware or software. The absolute value step is used to insure that the root is always taken of a positive value or of zero. This step does result in some noise being preserved in the result, but avoids the problem of complex numbers.

In some applications, the absolute value may be replaced with a simple rectifier circuit or positive value selection software. For these applications, the purpose of the absolute value step is preserved. The actual hardware or software may be considered to be implementing the spirit of the absolute value function, and is thus covered by this description.

At the system level, there are several constraints which must be observed for proper functioning of the transmitters and receivers. At several points in both the transmitter and receiver units in some implementations, it may be necessary to select between two forms of the same signal, which differ only in phase or sign. It is permissible that phase shifts or sign reversals occur on various physical channel signals, but it is imperative that the phase and sign of each of the signals 230 applied to the summation unit of the receiver be of the same phase and sign relative to the original information signal 100 so that the summation is constructive.

The transmitter and receiver units must not unduly distort the phase of the information signal on any of the carrier signals relative to the other carriers. In other words, phase shifts or distortions of the information signal must be reasonably consistent between the individual physical channels;

It is further important that the correlation process occur after reception and demodulation of the physical channel signal. The information signals are the signals that should be correlated, not the individual carrier signals or Intermediate Frequency signals. This correlation of demodulated signals is a fundamental difference from many diversity communication systems.

Simulations and experiments to test this system have been executed. In particular, the effects of phase delay on one or more channels, the effects of Gaussian noise, and the effects of "adjacent" channel interference have been explored. In all cases, the experiments have clearly demonstrated the effectiveness of the method in eliminating the effect of multipath and other forms of interference.

A number of advantages of the present invention are apparent in general, and over prior art:

- unlike Frequency Division Multiple Access, the number of available communication channels is a second order function of available frequency span, rather than a first order function;
- the communication channels can span a broad range of frequencies, do not require contiguous frequency bands, and can even mix technologies and transmission media;
- unlike Time Division Multiple Access, the communication bandwidth can be a large portion of the carrier channel bandwidth;
- synchronization between transmitter and receiver is not required;
- the near-far problem found in many Spread Spectrum systems is much reduced or in some cases, nonexistent;
- acquisition time is not required;
- implementation uses readily available technology in simple combination, thus reducing system complexity and cost;
- power control of transmitters to prevent near-far interference or to preclude boundary incursion is not normally required;
- frequency assignment is flexible, and need not be restricted by geographic boundaries as in cellular telephone systems;
- broad, even global, service areas can be achieved without interference between users, and without excessive consumption or saturation of available resources;
- individual users can be selected by a simple channel selection process;
- communications have a high inherent level of privacy, and various privacy assuring methods can be applied with the same or greater ease as with current communication methods;
- spectrum and channel efficiencies are high, and can in fact be greater than the theoretical maxima of most current methods;
- unlike most frequency diversity methods, all, or nearly all the signals transmitted contribute to the final message signal;
- the method is highly resistant to multipath interference and to noise;
- the method takes full advantage of the correlation between signals to increase signal to noise ratios and obtain a good, clean estimate of the message content;
- when used in radio communication, the method does not require multiple antenna sites as does spatial diversity;
- the method obtains the noise reduction advantages of previous correlation receivers, while adding the ability to select receivers, to reduce interference, and to expand the information capacity of a limited number of channels without reducing channel bandwidth or constraining power unduly

OPERATION

In order to describe the operation of the invention, it will be necessary to select a particular embodiment. It will be recognized that many other embodiments of the invention are possible and could be used as examples, and that this particular example was chosen for convenience. The actual preferred embodiment will depend on the application.

The example chosen to illustrate the operation is a mobile telephone application. In this application, a mobile transceiver communicates with a base station via radio transmissions. The base station provides connection to the telephone network. This discussion assumes that there are four information channels involved, out of a total of many thousand. The first channel, the signaling channel, is used by the mobile station to communicate with the base station. The second channel, the response channel, is used by the base station to communicate with the mobile station. The third channel, the voice out channel, is used by, the mobile station to transmit the user's voice signal to the base station. The fourth and final channel is the voice in channel, and is used by the base to send voice or other audio signals to the mobile user. Also, the discussion assumes that each carrier channel corresponds to a particular radio frequency different from any other channel carrier in the system.

Assuming that the user of the mobile unit desires to place a call, the desired number would be entered into the transceiver in a conventional manner, such as by keypad entry. The mobile processor unit commands the channel selector 130 to select the set of channel carriers 110 that correspond to the signaling channel. The processor unit prepares a message containing the desired number to be called, the number corresponding to itself, and a call request. This message is digitally encoded and forms the information signal 100 used to modulate the channel carriers. The carriers are combined in the transmitter 150, amplified, and broadcast out the mobile antenna as radio waves 160.

The base station monitors a dedicated set of communication channels used by mobile units for signalling. The base station continuously receives carrier signals. Only those containing coherent information on the set of carriers that form one of the monitored communication channels would produce an information signal containing a signalling request. The base channel selector matrix 185 directs the particular set of demodulated carrier signals to a specific correlation/summation unit 200 corresponding to this one particular signalling channel. Only a coherent input signal on each member of this specific set of carriers produces an information signal output from this communication channel. The information signal 190 is received by the base unit processor which decodes the desired number and the caller's self number. The base processor then signals the normal telephone network to establish a link with the desired number.

When the link is established, the base processor prepares an information signal 100 acknowledging the call request and indicating that the link has been established. The base channel selector 130 is instructed to select the carrier set corresponding to the response channel. This acknowledgement signal is used to form the information signal which modulates the set of channel carriers. The carriers are combined, amplified, and transmitted out the base unit antenna as radio waves.

The base unit also looks up in a table of sets, the sets of carriers which correspond to the voice in and voice out channels for the particular self number of the mobile unit. The base processor unit commands its channel selector 130 to select those carrier sets for transmit and receive respectively, and connects the information signal circuits of those channels to the voice signal of the called party. The actual switching circuitry and processes involved in establishing a telephone link and interconnecting circuitry are known art and are independent of this invention.

The mobile unit transmits on a dedicated set of carrier frequencies corresponding to its voice out channel. When the mobile user speaks, the voice signal forms the information signal which modulates the voice out channel set. The base unit receives this set of carriers, and obtains an information signal estimate which reproduces the original voice signal of the mobile user. This voice information signal received by the base unit is sent via the telephone network link to the called party.

The mobile unit receives a dedicated set of carrier frequencies corresponding to its voice in channel. Voice signals from the called party are received as a set of coherently modulated carriers. This particular carrier set corresponds to the voice in channel for this particular mobile user. The carriers are demodulated, correlated, summed and an information signal estimate prepared which approximates the original voice signal of the called party. Thus a bidirectional link is established, and a mobile telephone conversation can be conducted.

This example mobile user cannot receive voice in signals for other users since by the rules of carrier assignment, there will be no other user with sufficient common carrier channels to generate a meaningful information signal estimate. In this way, users are separated, and individual mobile units are selected. A similar example can be constructed where a mobile unit is called by a user in the regular telephone network.

SUMMARY, RAMIFICATIONS, AND SCOPE OF THE INVENTION

The invention uses the correlation which exists between multiple signals, each signal containing a copy of the intended message. The existence of this correlation allows embodiments of the invention to extract the information content of the signals in conditions where such extraction might be otherwise impossible due to noise, interference, or other difficulties. Further, the correlation allows selection of receivers by specification of a set of carriers containing the correlated signals. Without such specification, a receiver would be unable to readily determine which particular combination of carrier signals, out of what might be an extremely large number of combinations, contains the information of interest. Since the number of combinations of carriers is much larger than the number of individual carriers, the channels for communication are expanded greatly beyond the number of carrier channels.

In order to insure the existence and utilization of correlation, embodiments of this invention simultaneously transmit multiple copies of the original signal via appropriate media. A receiver portion of the system receives the copies, extracts the correlated parts of the signals, and prepares an estimate of the original message signal.

Numerous advantages of the present invention are apparent. Several are general and apply to information communication systems broadly, while others more specifically relate to prior art. Some of the more important advantages include:

- the number of channels for communication is roughly proportional to the square of the number of carrier channels;
- the communication channels are particularly resistant to noise and interference which is uncorrelated between the carrier channels, such as multipath;
- particular implementations can use a mix of transfer media and technologies such as radio, light wave, fiber optic, cable, and others as best suits the application, while still obtaining the benefits of the invention for noise and interference reduction, capacity expansion, receiver selection, etc.;
- depending on the particular implementation, nearly all the bandwidth of the carrier channel can be available as information bandwidth;
- interference from powerful nearby signal sources sharing the carrier channels is reduced by the invention, so the need for power control of transmitters, as well as near-far and related problems are reduced or eliminated;
- individual users are simply selected by specification of the appropriate set of carrier channels;
- high efficiency in terms of both power and channel utilization is possible since all, or most of the transmitted signals contribute to the output information signal.

The above description has attempted to illustrate the breadth of the invention by inclusion of several variations in implementation. It will be recognized by those skilled in the art that many other variations are possible that will be different in form but will still apply the principles of the invention. Furthermore, the invention may be applied in other areas where signal enhancement is necessary due to noise or other factors, selection or identification of communication channels, transmitters, or receivers is desired, and other such applications should be considered as anticipated by this invention. Some examples include:

- radar and sonar systems where the transmitter sends its signal as a set of carrier signals so that the returned echo can be distinguished from signals of other users in the same geographical area and signal frequency range. In such cases, the information signal is the range information contained in the time delay for the echo return, and other correlated information. It is anticipated that particular advantages would be obtained in reducing "clutter", in separating moving targets from stationary backgrounds, and in resistance to "jamming";
- local area computer, data, video, telephone, and other networks where interference from other users, reflections from structures in the environment, limits on the number of carriers available, and other constraints would reduce the effectiveness, or even preclude such a network;

transoceanic and other long distance communication links where limited channel capacity severely restricts the number of users.

The above list is not to be considered exhaustive, and the number of possible applications of this invention is very great. Accordingly, while the descriptions above contain many specificities, these specifics should not be construed as limitations on the scope of the invention, but rather as particulars of the examples used to illustrate the preferred embodiments of the invention. Accordingly, the scope of the invention should be determined not by the embodiments illustrated, but rather by the appended claims and their legal equivalents.

What is claimed is:

1. A method for communication of a common information signal from a transmitter to a receiver comprising the steps of:
   (a) selecting as a set of size greater than two, a plurality of channel carrier means, from a larger pool of available carrier means, such that no more than half of the carrier means in the set are shared with any other selected set from the same pool of available carrier means, said set being unique to an intended recipient of the common information signal to be communicated;
   (b) simultaneously modulating said plurality of channel carrier means with the common information signal to be communicated, to form a plurality of modulated carrier means;
   (c) transmitting simultaneously via said plurality of modulated carder means, a plurality of copies of said common information signal;
   (d) receiving and demodulating said plurality of modulated carder means to obtain a plurality of received demodulated signals each containing a copy of the common information signal;
   (e) forming a plurality of pairs of said received demodulated signals and correlating one member of each pair with all the other received demodulated signals to form a plurality of outputs, one output per each pair, such that the information in common between each received demodulated signal is reinforced in each output, and such that information not in common between each received demodulated signal is reduced in each output, said outputs forming a plurality of correlated common information signals;
   (f) summing said plurality of correlated common information signals instant by instant to form an estimate of the original common information signal.

2. The communication method of claim 1 wherein said step of correlating one member of a pair of the plurality of received demodulated signals from claim 1 with the other received demodulated signals comprises the steps of:
   (a) obtaining an unit sign of the pair of received demodulated signals;
   (b) obtaining a product of said pair of received demodulated signals;
   (c) obtaining an absolute value of said product;
   (d) extracting a square root of said absolute value;
   (e) obtaining a product of said unit sign of said pair of received demodulated signals with said square root.

3. The communication method of claim 1, wherein the identity of the transmitter of the plurality of modulated carrier means is uniquely distinguished by the particular set of channel carder means used.

4. A communication system for communication of a common information signal from a transmitter to a receiver comprising:
   (a) a means for selecting as a set of size greater than two, a plurality of channel carrier means, from a larger pool of available carrier means, such that no more than half of the carrier means in the set are shared with any other selected set from the same pool of available carrier means, said set being unique to an intended recipient of the information to be communicated;
   (b) a means for simultaneously modulating said plurality of channel carrier means with said common information signal to be communicated, to form a plurality of modulated carrier means;
   (c) a means for transmitting simultaneously via said plurality of modulated carrier means, a plurality of copies of said common information signal;
   (d) a means for receiving and demodulating said plurality of modulated carrier means to obtain a plurality of received demodulated signals each containing a copy of the common information signal;
   (e) a means for forming pairs of said received demodulated signals and correlating one member of each pair with all the other received demodulated signals to form a plurality of outputs such that the information in common between each received signal is reinforced in each output, and such that information not in common is reduced in each output, said outputs forming a plurality of correlated common information signals;
   (f) a means for summing said plurality of correlated common information signals instant by instant to form an estimate of the original common information signal.

5. The communication system of claim 4 wherein said means for correlating one member of a pair of the plurality of received demodulated signals with the other member comprises:
   (a) a means for obtaining an unit sign of the pair of received demodulated signals;
   (b) a means for obtaining a product of said pair of received demodulated signals;
   (c) a means for obtaining an absolute value of said product;
   (d) a means for extracting a square root of said absolute value;
   (e) a means for obtaining a product of said unit sign of said pair of received demodulated signals with said square root.

6. The communication system of claim 4, wherein the identity of the transmitter of the plurality of modulated carrier means is uniquely distinguished by the particular set of channel carrier means used.

7. The communication system of claim 4 wherein each of said plurality of channel carrier means comprises one of the following:
   (a) an electromagnetic wave frequency; or
   (b) a flow of electrons in a direct electrical connection; or
   (c) a flow of photons in an individual optical connection.

8. The communication system of claim 4 wherein each of one or more of said plurality of channel carrier means is an individual sound frequency.

9. A method for exclusive information transfer from a transmitter to a receiver comprising the steps of:
   (a) selecting a unique set of channel carrier means from a larger pool of available carrier means, such that no more than half of the carrier means in the set are shared with any other selected set from the same pool of available carrier means;
   (b) simultaneously modulating said unique set of channel carder means by a common information signal, so as to form a unique set of modulated carrier means;

(c) transmitting simultaneously via said unique set of modulated carrier means, a plurality of copies of said common information signal;

(d) receiving said unique set of modulated carrier means to obtain a plurality of received demodulated signals;

(e) correlating and summing said plurality of received demodulated signals each with another to form an output such that information in common between each received demodulated signal is reinforced in the output, and such that information not in common between each received demodulated signal is reduced in the output, to form an estimate of said common information signal.

10. The information transfer method of claim 9 wherein said step for correlating the plurality of received demodulated signals comprises the steps of:

(a) obtaining an unit sign of a pair of received demodulated signals;

(b) obtaining a product of said pair of received demodulated signals;

(c) obtaining an absolute value of said product;

(d) extracting a square mot of said absolute value;

(e) obtaining a product of said unit sign of said pair of demodulated signals with said square root.

11. The information transfer method of claim 9, wherein the identity of the transmitter of the plurality of modulated carrier means is uniquely distinguished by the particular set of channel carrier means used.

12. The information transfer method of claim 9 including a step for selecting among sets of channel carrier means, each set consisting of a plurality of channel carrier means.

13. The information transfer method of claim 9 including a step for selecting one of a plurality of unique sets of channel carrier means, wherein a transmitter exclusively addresses a plurality of receivers, and a receiver exclusively receives signals from a plurality of transmitters.

* * * * *